(12) United States Patent
Shabelina et al.

(10) Patent No.: US 10,167,347 B2
(45) Date of Patent: Jan. 1, 2019

(54) CARBOXYLATE ESTER OF POLYSACCHARIDE

(71) Applicant: BASF SE, Ludwigshafen (DE)

(72) Inventors: Natalia Shabelina, Mannheim (DE); Helmut Witteler, Wachenheim (DE); Juergen Detering, Limburgerhof (DE); Ulrich Schneider, Ludwigshafen (DE); Jessica Neumann, Monsheim (DE)

(73) Assignee: BASF SE, Ludwigshafen (DE)

( * ) Notice: Subject to any disclaimer, the term of this patent is extended or adjusted under 35 U.S.C. 154(b) by 110 days.

(21) Appl. No.: 15/125,220

(22) PCT Filed: Mar. 11, 2015

(86) PCT No.: PCT/EP2015/055056
§ 371 (c)(1),
(2) Date: Sep. 12, 2016

(87) PCT Pub. No.: WO2015/144438
PCT Pub. Date: Oct. 1, 2015

(65) Prior Publication Data
US 2017/0114154 A1    Apr. 27, 2017

(30) Foreign Application Priority Data
Mar. 25, 2014  (EP) .................... 14161502

(51) Int. Cl.
C11D 3/22    (2006.01)
C08B 37/00   (2006.01)
C11D 3/39    (2006.01)
C11D 11/00   (2006.01)

(52) U.S. Cl.
CPC .......... C08B 37/0054 (2013.01); C11D 3/226 (2013.01); C11D 3/39 (2013.01); C11D 11/0017 (2013.01); C11D 11/0023 (2013.01)

(58) Field of Classification Search
CPC ............................. C11D 3/226; C08B 37/00
See application file for complete search history.

(56) References Cited

U.S. PATENT DOCUMENTS 3,022,287 A * 2/1962 Mench ............... A61K 9/2866
                                                       536/63
4,659,849 A    4/1987 Drobnik et al.
5,877,144 A    3/1999 Ehrhardt et al.
6,063,914 A    5/2000 Wolf et al.
2011/0257124 A1 10/2011 Fenn et al.

FOREIGN PATENT DOCUMENTS

| | | |
|---|---|---|
| CN | 1962700 A | 5/2007 |
| CN | 102199410 A | 9/2011 |
| EP | 0 703 243 A1 | 3/1996 |
| EP | 0 792 888 A1 | 9/1997 |
| EP | 1 939 219 A1 | 7/2008 |
| JP | H08301790 A | 11/1996 |
| WO | WO-00/18860 A1 | 4/2000 |
| WO | WO-01/00771 A1 | 1/2001 |
| WO | WO-2006/117071 A1 | 11/2006 |

OTHER PUBLICATIONS

Biswas, A., et al., "Rapid Preparation of Starch Maleate Half-Esters." *Carbohydrate Polymers* vol. 64, No. 3 (2006), pp. 484-487.
Vermeersch, J., et al., "Synthesis and Characterization of Inulin Monosuccinates." *Die Makromolekulare Chemie*, vol. 187, No. 1 (1986), pp. 125-131.
International Search Report for Patent Application No. PCT/EP2015/055056, dated May 22, 2015.
U.S. Appl. No. 15/104,290, filed Jun. 14, 2016.
International Patent Application No. PCT/EP2014/077221, filed Dec. 10, 2014.
Liu, X., et al., "Study of Dextrin-Derived Curing Agent for Waterborne Epoxy Adhesive," *Carbohydrate Polymers* 83, No. 3 (2011), pp. 1180-1184.
Shao, Z., et al., "Research and Application of Pharmaceutical Excipients from Natural Cellulose." *Polymeric Materials Science and Engineering* vol. 23, No. 1 (2007), pp. 6-10.

* cited by examiner

*Primary Examiner* — Brian P Mruk

(74) *Attorney, Agent, or Firm* — Marshall, Gerstein & Borun LLP

(57) ABSTRACT

The invention relates to a carboxylate ester of polysaccharide characterized in that it possesses ester bonds with trimellitic anhydride and is soluble in water. The polysaccharide is esterified with trimellitic anhydride and the degree of substitution of the polysaccharide lies in the range of from 0.5 to 3. The invention further relates to methods for the manufacture of these polysaccharides esters in organic solvents, in water or in an extruder or a kneader and to their use in fabric and home care formulations.

15 Claims, No Drawings

CARBOXYLATE ESTER OF POLYSACCHARIDE

CROSS-REFERENCE TO RELATED APPLICATIONS

This is the U.S. National Phase of International Application No. PCT/EP2015/055056, filed Mar. 11, 2015, which claims the benefit of European Patent Application No. 14161502.1, filed Mar. 25, 2014.

The invention relates to carboxylate ester of polysaccharide characterised in that it possesses ester bonds with trimellitic anhydride and are soluble in water. The invention further relates to methods for the manufacture of these polysaccharides esters and to their use in fabric and home care formulations.

Due to the increasing demand for environmentally friendly and sustainable polymers the development of biodegradable polymers in the area of fabric care, home care but also in the area of water treatment has become more and more important. Typical state-of-the-art polymers for laundry or automatic dish washing applications are non-biodegradable. Polymers obtainable by free-radical polymerization and composed of monomers containing carboxy groups and/or sulfonic acid groups have been an important constituent of phosphate-containing and phosphate-free fabric and home care formulations for many years. By virtue of their soil-dispersing and deposit-inhibiting effect, they make a considerable contribution to the cleaning and rinsing performance of fabric and home care formulations. For instance, they ensure that no salt deposits of the hardness-forming calcium and magnesium ions remain on the ware or on the textile. These polymers are also used in water-conveying systems as agents for preventing mineral deposits such as e.g. calcium and magnesium sulfate, magnesium hydroxide, calcium and barium sulfate and calcium phosphate on heat transfer surfaces or in pipelines. Water-conveying systems to be mentioned here are inter alia cooling and boiler feed water systems and industrial process waters. However, these polymers are also used as scale inhibitors in the desalination of seawater or brackish water by distillation and by membrane processes such as reverse osmosis or electrodialysis.

One disadvantage of these polymers obtainable by free-radical polymerization and composed of monomers containing carboxy groups and/or sulfonic acid groups is that they are not biodegradable.

Many attempts have been made to find biodegradable alternatives to acrylic acid based dispersants and antiscalants:

WO 01/00771 A1 reports the esterification of fructans with acetic anhydride in water and its use as a bleach activator. The degree of substitution of the obtained acetylated fructan lies in the range of from 0.4 to 2.5.

U.S. Pat. No. 5,877,144 describes aliphatic carboxylate esters of inulin having at least six monosaccharide units linked together wherein the inulin is esterified with anhydrides of carboxylic acids such as acetic anhydride, lauric anhydride, palmitic anhydride. The inulin esters have a degree of substitution of less than 0.5 and are proposed as surfactants.

Makromol. Chem. 187, 125-131 (1986) reads on the derivatives of inulin by esterification with succinic anhydride and the use of 4-dimethylaminopyridine and 1-methylimidazole as acylation catalysts.

Carbohydrate Polymers 64 (2006) 484-487 describes the esterification of starch with succinic anhydride in water and in organic solvents such as dimethylsulfoxide and the formation of biodegradable hydrogels.

US 2011/0257124 A1 reads on a polysaccharide osmotic comprising monosaccharide monomers which are esterified with a dicarboxylic and/or tricarboxylic acid. The tricarboxylic acid is citric acid. The osmotic is used in a dialysis solution for peritoneal dialysis treatment.

EP 1 939 219 A1 discloses non-crosslinked, highly citrated, water-soluble polysaccharides, their preparation process in an organic solvent and their use in cosmetic and pharmaceutical formulations.

EP 0 703 243 A1 describes a process for preparing polysaccharides with one or more hydrophobic side chains in a mixture comprising at most 25% by weight of water. The hydrophobic side chains are C6-C24 alk(en)yl compounds, resulting from the esterification of starch with e.g. C6-C24 alk(en)yl succinic anhydride.

U.S. Pat. No. 6,063,914 reads on a process for producing starch maleates by reacting starch with maleic acid anhydride in water. The pH is maintained constant between 7 and 11, preferably between 8 and 9, during the reaction of the anhydride with the starch.

Though many of the described esterified polysaccharides are biodegradable, many fail to exhibit an acceptable performance as to their calcium carbonate inhibition capacity. The inhibition of inorganic scale such as calcium carbonate is a very important parameter when it comes to applications in the field of fabric and home care. The inhibition of inorganic scale enables a control of water hardness, thus increasing the effectiveness of washing agents such as surfactants. The inhibition of organic scale prevents as well the redeposition of soil and has an impact on rinsing, thus enabling a reduction of water spots and an improvement of shine on surfaces such as glasses. Besides, biodegradable polysaccharide esters are usually easily hydrolyzed at a basic pH: this is an issue for their application in laundry and automatic dish washing where the pH of the wash liquor generally lies in the range of 8 to 11. Additionally the long-term stability of such polysaccharide esters in liquid fabric and home care formulations is affected by their insufficient hydrolysis stability. In particular, for those of the biodegradable polysaccharide esters who exhibit an acceptable performance as to their calcium carbonate inhibition capacity, their lack of stability leads to a decrease and even an absence of effective inorganic scale inhibition.

It was therefore an object of the invention to provide substances which at the same time are biodegradable and can be advantageously used for cleaning purposes or for the purpose of scale inhibition in water-conveying systems and are stable against hydrolysis at basic pH. It was a further object of the invention to provide substances which can be readily incorporated into formulations for cleaning purposes in their various presentation forms.

It has surprisingly been found that these objects are achieved, as is evident from the disclosure of the present invention, by a carboxylate ester of polysaccharide, wherein the polysaccharide is esterified with trimellitic anhydride and wherein the degree of substitution of the polysaccharide lies in the range of from 0.5 to 3.

Preferably, the degree of substitution of the polysaccharide lies in the range of 0.75 to 3, even more preferably in the range of 1 to 2.5.

The polysaccharide is preferably a water-soluble polysaccharide such as inulin, maltodextrin, xyloglucan, alginate, starch or a mixture thereof. Preferably, the polysaccharide is inulin or maltodextrin. It is to be noted that low molecular weight water-soluble polysaccharides such as inulin and maltodextrin are also soluble in certain organic solvents such as dimethylformamide, dimethylsulfoxide and pyridine.

Starch is a mixture of amylose and amylopectin, wherein the amount of amylose is present in the mixture in an amount of 20 to 30 wt % and the amylopectin is present in the mixture in an amount of 70 to 80 wt %. Amylose is a linear polysaccharide consisting of α-1,4-linked D-glucose. Amylopectin is a high molecular weight polysaccharide with the same backbone as amylose but with α-1,6-linked branching points every 24 to 30 glucose units.

Maltodextrin is a polysaccharide produced by partial hydrolysis of starch and consists of α-1,4-linked D-glucose.

Xyloglucan has a backbone of β-1,4-linked glucose residues, most of which is substituted with 1-6 linked xylose side chains. The xylose residues are often capped with a galactose residue. Alginate is a linear copolymer comprising homopolymeric blocks of β-1,4-linked D-mannuronate and α-L-guluronate residues, covalently linked together in different sequences or blocks. Inulin is a linear polydisperse polysaccharide and consists of a chain of β-2,1-linked furanoid fructose units which is terminated at the reducing end by an α-D glucose molecule. The most important sources of inulin are chicories (*Cichorium intybus*), dahlias (*Dahlia Pinuata* Cav.) and Jerusalem artichokes (*Helianthus tuberosis*). The molecular weight distribution and average chain length depends on the type of plant from which it is isolated, on the weather conditions during the growth of the plant and on the age of the plant. The average chain length of inulin may vary from 3 to 100. As used herein, the average chain length of inulin varying from 6 to 100 fructose units shall be understood as meaning "inulin having 6 to 100 mutually linked fructose units."

In a preferred embodiment of the present invention, the polysaccharide is inulin and the average chain length of the inulin lies in the range of from 3 to 100 fructose units. Preferably, the polysaccharide is inulin and the average chain length of the inulin lies in the range of from 5 to 50 fructose units, even more preferably the average chain length of the inulin lies in the range of from 10 to 40 fructose units.

Preferably the inventive carboxylate ester of polysaccharide is present as an anionic carboxylate (represented for example by Formula A) and forms a salt with cationic counterions such as sodium, potassium, magnesium or calcium counterions.

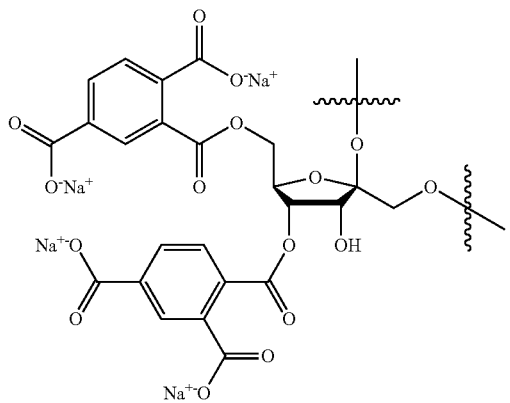

Formula A

The inventive carboxylate ester of polysaccharide is water-soluble, the reaction conditions are selected in a way that only the anhydride function of trimellitic anhydride reacts with the polysaccharide. The acid function of trimellitic anhydride does not react with the polysaccharide. This leads to products with are not cross-linked and which do not form gels.

The inventive carboxylate ester of polysaccharide can be manufactured by a method comprising the steps of:
i) mixing the polysaccharide with trimellitic anhydride and a catalyst in an organic solvent, wherein the molar ratio of trimellitic anhydride to monosaccharide unit lies in the range of from 1:2 to 4:1,
ii) stirring the solution obtained in step i) at a temperature lying in the range of from 20° C. to 100° C. for 1 to 10 hours,
iii) precipitating the esterified polymer obtained in step ii) by adding a mixture of sodium hydroxide and methanol to the reaction mixture obtained in step ii).

It is understood that the molar ratio of trimellitic anhydride to monosaccharide unit shall mean the molar ratio of trimellitic anhydride to anhydro glucose unit AGU (e.g. in the case where the polysaccharide is maltodextrin) or the molar ratio of trimellitic anhydride to anhydro fructose unit AFU (e.g. in the case where the polysaccharide is inulin).

The organic solvent can be pyridine, dimethylformamide, dimethyl sulfoxide, N-methylpyrrolidone, acetonitrile, tetrahydrofurane, acetone or a mixture thereof. Preferably, the organic solvent is pyridine, dimethylformamide, dimethyl sulfoxide or a mixture thereof.

The catalyst accelerates the esterification reaction and is preferably a nucleophilic catalyst, in particular, pyridine, 4-dimethylaminopyridine, 1-methyl-imidazole, or a mixture thereof. Those skilled in the art are familiar with other catalysts having similar activity. The catalyst may also be a base such as triethylamine. Even though pyridine is used as a solvent, it also plays a role as catalyst.

The catalyst present is added to the solution preferably in an amount of 0.0001 to 1 mol per AGU (or per AFU).

Preferably, the esterification reaction of step ii) is carried out by mixing the solution obtained in step i) at a temperature lying in the range of from 40° C. to 100° C., preferably during 4 to 6 hours. The molar ratio of trimellitic anhydride to monosaccharide unit lies in the range of from 1:2 to 4:1, preferably from 1:1.5 to 3:1, even more preferably from 1:1 to 3:1.

The inventive carboxylate ester of polysaccharide is then separated from the solution by precipitation by the addition of a mixture of sodium hydroxide and an alcohol. The alcohol is preferably methanol, ethanol, propanol, isopropanol, even more preferably methanol.

In a preferred embodiment, the precipitate obtained in step iii) is filtered, washed with methanol and dried at a temperature of 20° C. to 100° C. under normal or lower pressure.

In another preferred embodiment, the inventive carboxylate ester of polysaccharide can be manufactured by a method comprising the steps of:
i) mixing the polysaccharide with water and with an aqueous alkali solution which optionally comprises 1-methyl-imidazole,
ii) stirring the solution obtained in step i) with trimellitic anhydride at a temperature lying in the range of from 0° C. to 50° C. for 1 to 10 hours, wherein the pH of the solution is maintained at a pH of from 8 to 9 by addition of an aqueous alkali solution and wherein the molar ratio of trimellitic anhydride to monosaccharide unit lies in the range of from 1:2 to 4:1, iii) optionally precipitating the polymer obtained in step ii) by freeze drying, spray drying or spray granulation.

The esterification in aqueous medium is the more environmentally friendly approach. The esterification of polysaccharides occurs by the nucleophilic substitution reaction between ionized hydroxyl groups of polysaccharide and the anhydride. At the same time as the esterification reaction, some hydrolysis side product such as the salt of trimellitic acid formed from the anhydride can be observed. Under aqueous conditions it is important to consider that hydrolysis and esterification are competitive reactions. All reactions lead to pH decrease. Therefore, it is important to keep the reaction constant at pH between 8 and 9. Further increase of the pH leads to hydrolysis of half ester.

Preferably, the esterification reaction of step ii) is carried out by mixing the solution obtained in step i) at a temperature lying in the range of 0° C. to 30° C., preferably during 5 to 8 hours.

The molar ratio of trimellitic anhydride to monosaccharide unit lies in the range of from 1:2 to 4:1, preferably from 1:1.5 to 3:1, even more preferably from 1:1 to 3:1.

The pH can be maintained constant by the addition of an aqueous alkali solution. Alkali hydroxide and alkaline-earth hydroxides as well as the oxides and carbonates of alkali metals and/or of alkaline earth metals are especially useful, such as sodium hydroxide, potassium hydroxide, calcium hydroxide, ammonium hydroxide, magnesium hydroxide, sodium carbonate. Preferably, sodium hydroxide in aqueous solution is used to maintain the pH of the solution constant. Spray-drying may be performed in a spray dryer, for example a spray chamber or a spray tower. The solution obtained according to step ii) with a temperature preferably higher than ambient temperature, for example in the range of from 50 to 95° C., is introduced into the spray dryer through one or more spray nozzles into a hot gas inlet stream, for example nitrogen or air, the solution being converted into droplets and the water being vaporized. The hot gas inlet stream may have a temperature in the range of from 125 to 350° C.

In another embodiment of the present invention, a drying vessel, for example a spray chamber or a spray tower, is being used in which a spray granulating process is being performed by using a fluidized bed. Such a drying vessel is charged with a fluidized bed of a solid mixture of inventive carboxylate ester of polysaccharide, obtained by any drying method such as the spray drying described above, and a solution or slurry of solid mixture of inventive carboxylate ester of polysaccharide is sprayed onto or into such fluidized bed together with a hot gas stream. The hot gas inlet stream may have a temperature in the range of from 125 to 350° C., preferably 160 to 220° C.

In another preferred embodiment, the inventive carboxylate ester of polysaccharide can be manufactured by reacting the polysaccharide with trimellitic anhydride in an extruder or a kneader in the absence of a solvent and in the presence of a catalyst and wherein the molar ratio of trimellitic anhydride to the monosaccharide unit lies in the range of from 1:2 to 4:1. The reaction can also take place in the presence of a surfactant, preferably in an amount of from 10 wt % to 60 wt % based on the total weight of the reaction products, even more preferably in an amount of from 20 to 50% based on the total weight of the reaction products. The preferred surfactant is a non-ionic surfactant such as alkoxylated linear or branched aliphatic alcohols (e.g. ethoxylated fatty alcohols) or block copolymers of ethylene oxide and propylene oxide.

In another embodiment the reaction can also take place in the presence of polyethylene glycol with a molecular weight of 500 g/mol to 12000 g/mol.

The catalyst is a nucleophilic catalyst, preferably 4-dimethylaminopyridine, pyridine, or 1-methyl-imidazole.

The inventive carboxylate ester of polysaccharide according to the invention can be available as a solution in an aqueous or organic solvent, as a powder or as a granule. For the purposes of this invention, powder-shaped materials comprising the inventive carboxylate ester of polysaccharide have a particle size in the range from 1 μm to 0.1 mm and granule-shaped materials comprising the inventive carboxylate ester of polysaccharide have a particle size in the range from 0.1 mm to 2 mm.

Compositions Comprising the Inventive Carboxylate Ester of Polysaccharide

A further embodiment of the invention is given by an aqueous solution or a powder comprising the carboxylate ester of polysaccharide according to the invention.

Another embodiment of the invention is related to cleaning agents containing the carboxylate ester of polysaccharide according to the invention such as liquid laundry cleaning composition, hard surface cleaning compositions, water treatment compositions, automatic dishwashing detergent composition or a powder laundry cleaning composition containing the carboxylate ester of polysaccharide according to the invention.

The term "cleaning agents" includes compositions for dishwashing, especially hand dishwash and automatic dishwashing and ware-washing, and compositions for hard surface cleaning such as, but not limited to compositions for bathroom cleaning, kitchen cleaning, floor cleaning, descaling of pipes, window cleaning, car cleaning including, truck cleaning, furthermore, open plant cleaning, cleaning-in-place, metal cleaning, disinfectant cleaning, farm cleaning, high pressure cleaning, and in addition, laundry detergent compositions.

Such cleaning agents may be liquids, gels or preferably solids at ambient temperature, solids cleaning agents being preferred. They may be in the form of a powder or in the form of a unit dose, for example as a tablet.

In one embodiment of the present invention, the cleaning agent is a laundry cleaning composition comprising from 0.1% to about 10% by weight of the inventive carboxylate ester of polysaccharide and from 1% to about 70% by weight of one or more surfactants.

In another embodiment of the present invention, inventive cleaning agents that are determined to be used for hard surface cleaning may contain 0.1 to 70% by weight of at least one surfactant, selected from nonionic surfactants, anionic surfactants, amphoteric surfactants and amine oxide surfactants. Preferably, the inventive cleaning agent is an automatic dishwashing detergent composition comprising from 0.1% to about 15% by weight of the inventive carboxylate ester of polysaccharide, from 0.1% to 30% by weight of bleaches and optionally bleach activators and from 1% to about 30% by weight of one or more surfactants.

The cleaning agent may contain a bleaching agent such as peroxy compounds. Examples of suitable peroxy compounds are sodium perborate, anhydrous or for example as monohydrate or as tetrahydrate or so-called dihydrate, sodium percarbonate, anhydrous or, for example, as monohydrate, hydrogen peroxide, persulfates, organic peracids such as peroxylauric acid, peroxystearic acid, peroxy-α-naphthoic acid, 1,12-diperoxydodecanedioic acid, perbenzoic acid, peroxylauric acid, 1,9-diperoxyazelaic acid, diperoxyisophthalic acid, in each case as free acid or as alkali metal salt, in particular as sodium salt, also sulfonylperoxy acids and cationic peroxy acids.

In one embodiment of the present invention, inventive cleaning agents may contain in the range of from 1 to 20% by weight of the inventive carboxylate ester of polysaccharide and in the range of from 0.5 to 30% by weight of bleach.

Percentages are based on the solids content of the respective inventive cleaning agent. Inventive cleaning agents may contain further ingredients such as one or more surfactants that may be selected from non-ionic, zwitterionic, cationic, and anionic surfactants. Other ingredients that may be contained in inventive cleaning agents may be selected from bleach activators, bleach catalysts, corrosion inhibitors, sequestering agents, fragrances, dyestuffs, antifoams, builders, cobuilders and fillers such as sodium sulfate.

Particularly advantageous inventive cleaning agents may contain one or more complexing agents. Preferred complexing agents are selected from the group consisting of nitrilotriacetic acid, ethylendiaminetetraacetic acid, diethylenetriaminepentaacetic acid, hydroxyethylethylenediaminetriacetic acid, methylglycinediacetic acid, glutamic acid diacetic acid, iminodisuccinic acid, hydroxyiminodisuccinic acid, ethylenediaminedisuccinic acid, aspartic acid-diacetic acid, and salts thereof. Particularly preferred complexing agents are methylglycinediacetic acid and glutamic acid diacetic acid and salts, especially sodium salts, thereof.

A further class of complexing agents are polymers carrying complexing groups like, for example, polyethyleneimine in which 20 to 90 mole % of the N-atoms bear at least one $CH_2COO^-$ group, and their respective alkali metal salts, especially their sodium salts.

Inventive cleaning agents may contain one or more surfactant, preferably one or more non-ionic surfactant.

Preferred non-ionic surfactants are alkoxylated alcohols, di- and multiblock copolymers of ethylene oxide and propylene oxide and reaction products of sorbitan with ethylene oxide or propylene oxide, alkyl polyglycosides (APG), hydroxyalkyl mixed ethers and amine oxides.

Preferred examples of alkoxylated alcohols and alkoxylated fatty alcohols are, for example, compounds of the general formula (I)

$$R^2-O-\left[\begin{array}{c}R^1\\|\\O\end{array}\right]_m\left[\begin{array}{c}\\O\end{array}\right]_n R^3 \quad (I)$$

in which the variables are defined as follows:
$R^1$ is identical or different and selected from hydrogen and linear $C_1$-$C_{10}$-alkyl, preferably in each case identical and ethyl and particularly preferably hydrogen or methyl,
$R^2$ is selected from $C_8$-$C_{22}$-alkyl, branched or linear, for example n-$C_8H_{17}$, n-$C_{10}H_{21}$, n-$C_{12}H_{25}$, n-$C_{14}H_{29}$, n-$C_{16}H_{33}$ or n-$C_{18}H_{37}$,
$R^3$ is selected from $C_1$-$C_{10}$-alkyl, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl or isodecyl,
m and n are in the range from zero to 300, where the sum of n and m is at least one, preferably in the range of from 3 to 50. Preferably, m is in the range from 1 to 100 and n is in the range from 0 to 30.

In one embodiment, compounds of the general formula (I) may be block copolymers or random copolymers, preference being given to block copolymers.

Other preferred examples of alkoxylated alcohols are, for example, compounds of the general formula (II)

$$R^4-O-\left[\begin{array}{c}R^1\\|\\O\end{array}\right]_a\left[\begin{array}{c}\\O\end{array}\right]_b\left[\begin{array}{c}R^1\\|\\O\end{array}\right]_d H \quad (II)$$

in which the variables are defined as follows:
$R^1$ is identical or different and selected from hydrogen and linear $C_1$-$C_0$-alkyl, preferably identical in each case and ethyl and particularly preferably hydrogen or methyl,
$R^4$ is selected from $C_6$-$C_{20}$-alkyl, branched or linear, in particular n-$C_8H_{17}$, n-$C_{10}H_{21}$, n-$C_{12}H_{25}$, n-$C_{14}H_{29}$, n-$C_{16}H_{33}$, n-$C_{18}H_{37}$,
a is a number in the range from zero to 10, preferably from 1 to 6,
b is a number in the range from 1 to 80, preferably from 4 to 20,
d is a number in the range from zero to 50, preferably 4 to 25.

The sum a+b+d is preferably in the range of from 5 to 100, even more preferably in the range of from 9 to 50.

Preferred examples for hydroxyalkyl mixed ethers are compounds of the general formula (III)

$$R^5-O-[CH_2CH(CH_3)O]_c[CH_2CH_2O]_d[CH_2CH(CH_3)O]_eCH_2CH(OH)R^6 \quad (III),$$

in which $R^5$ is a linear or branched aliphatic hydrocarbon radical with 4 to 22 carbon atoms or mixtures thereof,
$R^6$ refers to a linear or branched hydrocarbon radical with 2 to 26 carbon atoms or mixtures thereof,
c and e are values between 0 and 40, and
d is a value of at least 15.

Also suitable in the context of the present invention are surfactants of the formula (IV)

$$R^7O-(CH_2CHR^8O)_f(CH_2CH_2O)_g(CH_2CHR^9O)_h-CO-R^{10} \quad (IV),$$

in which $R^7$ is a branched or unbranched alkyl radical with 8 to 16 carbon atoms,
$R^8$, $R^9$, independently of one another, are H or a branched or unbranched alkyl radical with 1 to 5 carbon atoms,
$R^{10}$ is an unbranched alkyl radical with 5 to 17 carbon atoms,
f, h, independently of one another, are a number from 1 to 5, and
g is a number from 13 to 35.

Compounds of the general formula (II), (III) and (IV) may be block copolymers or random copolymers, preference being given to block copolymers.

Further suitable nonionic surfactants are selected from di- and multiblock copolymers, composed of ethylene oxide and propylene oxide. Further suitable nonionic surfactants are selected from ethoxylated or propoxylated sorbitan esters. Amine oxides or alkyl polyglycosides, especially linear $C_4$-$C_{16}$-alkyl polyglucosides and branched $C_8$-$C_{14}$-alkyl polyglycosides such as compounds of general average formula (V) are likewise suitable.

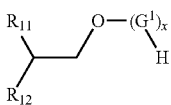 (V)

wherein the integers are defined as follows:
$R^{11}$ is $C_1$-$C_4$-alkyl, in particular ethyl, n-propyl or isopropyl,
$R^{12}$ is —$(CH_2)_2$—$R^5$,
$G^1$ is selected from monosaccharides with 4 to 6 carbon atoms, especially from glucose and xylose,
x in the range of from 1.1 to 4, x being an average number.

An overview of suitable further nonionic surfactants can be found in EP-A 0 851 023 and in DE-A 198 19 187.

Mixtures of two or more different nonionic surfactants may also be present.

Other surfactants that may be present are selected from amphoteric (zwitterionic) surfactants and anionic surfactants and mixtures thereof.

Examples of amphoteric surfactants are those that bear a positive and a negative charge in the same molecule under use conditions. Preferred examples of amphoteric surfactants are so-called betaine-surfactants. Many examples of betaine-surfactants bear one quaternized nitrogen atom and one carboxylic acid group per molecule. A particularly preferred example of amphoteric surfactants is cocamidopropyl betaine (lauramidopropyl betaine).

Examples of amine oxide surfactants are compounds of the general formula (VI)

$$R^{13}R^{14}R^{15}N \rightarrow O \qquad (VI)$$

wherein $R^{13}$, $R^{14}$ and $R^{15}$ are selected independently from each other from aliphatic, cycloaliphatic or $C_2$-$C_4$-alkylene $C_{10}$-$C_{20}$-alkylamido moieties. Preferably, $R^{13}$ is selected from $C_8$-$C_{20}$-alkyl or $C_2$-$C_4$-alkylene $C_{10}$-$C_{20}$-alkylamido and $R^{14}$ and $R^{15}$ are both methyl.

A particularly preferred example is lauryl dimethyl aminoxide, sometimes also called lauramine oxide. A further particularly preferred example is cocamidylpropyl dimethylaminoxide, sometimes also called cocamidopropylamine oxide.

Examples of suitable anionic surfactants are alkali metal and ammonium salts of $C_8$-$C_{18}$-alkyl sulfates, of $C_8$-$C_{18}$-fatty alcohol polyether sulfates, of sulfuric acid half-esters of ethoxylated $C_4$-$C_{12}$-alkylphenols (ethoxylation: 1 to 50 mol of ethylene oxide/mol), $C_{12}$-$C_{18}$ sulfo fatty acid alkyl esters, for example of $C_{12}$-$C_{18}$ sulfo fatty acid methyl esters, furthermore of $C_{12}$-$C_{18}$-alkylsulfonic acids and of $C_{10}$-$C_{18}$-alkylarylsulfonic acids. Preference is given to the alkali metal salts of the aforementioned compounds, particularly preferably the sodium salts.

Further examples for suitable anionic surfactants are soaps, for example the sodium or potassium salts of stearoic acid, oleic acid, palmitic acid, ether carboxylates, and alkylether phosphates.

Preferably, laundry detergent compositions contain at least one anionic surfactant.

In one embodiment of the present invention, inventive cleaning agents that are determined to be used as laundry detergent compositions may contain 0.1 to 70% by weight of at least one surfactant, selected from nonionic surfactants, anionic surfactants, amphoteric surfactants and amine oxide surfactants.

In a preferred embodiment, inventive cleaning agents do not contain any anionic detergent. Inventive cleaning agents may comprise one or more bleach catalysts. Bleach catalysts can be selected from bleach-boosting transition metal salts or transition metal complexes such as, for example, manganese-, iron-, cobalt-, ruthenium- or molybdenum-salen complexes or carbonyl complexes. Manganese, iron, cobalt, ruthenium, molybdenum, titanium, vanadium and copper complexes with nitrogen-containing tripod ligands and also cobalt-, iron-, copper- and ruthenium-amine complexes can also be used as bleach catalysts.

Inventive cleaning agents may comprise one or more bleach activators, for example N-methylmorpholinium-acetonitrile salts ("MMA salts"), trimethylammonium acetonitrile salts, N-acylimides such as, for example, N-nonanoyl-succinimide, n-nonanoyl- or isononanoyloxybenzenesulfonates, 1,5-diacetyl-2,2-dioxohexahydro-1,3,5-triazine ("DADHT") or nitrile quats (trimethylammonium acetonitrile salts).

Further examples of suitable bleach activators are tetraacetylethylenediamine (TAED) and tetraacetylhexylenediamine.

Inventive cleaning agents may comprise one or more corrosion inhibitors. In the present case, this is to be understood as including those compounds which inhibit the corrosion of metal. Examples of suitable corrosion inhibitors are triazoles, in particular benzotriazoles, bisbenzotriazoles, aminotriazoles, alkylaminotriazoles, also phenol derivatives such as, for example, hydroquinone, pyrocatechol, hydroxyhydroquinone, gallic acid, phloroglucinol or pyrogallol.

In one embodiment of the present invention, inventive cleaning agents comprise in total in the range from 0.1 to 1.5% by weight of corrosion inhibitor.

Inventive cleaning agents may contain one or more builders or cobuilders. Builders and cobuilders are water soluble or water insoluble substances, the main task of which consists in the binding of calcium and magnesium ions thus reducing the water hardness. Cobuilders often are of organic nature. They support the effectiveness of the builder system due to their sequestering and in case of polymeric cobuilders dispersing and antiscaling properties.

These may be low molecular weight carboxylic acids and salts thereof, such as alkali metal citrates, especially anhydrous trisodium citrate and its hydrates, alkali metal succinates, alkali metal malonates, fatty acid sulfonates, oxydisuccinate, alkyl or alkenyl disuccinates, tartaric acid monosuccinate, tartaric acid disuccinate, tartaric acid monoacetate, tartraric acid diacetate and α-hydroxypropionic acid.

Another substance class with cobuilder properties which may be present in the inventive cleaning agents is that of phosphonic acid derivatives. These are especially hydroxyalkane- or aminoalkanephosphonates, for example the disodium salt of hydroxyethane-1,1-diphosphonic acid ("HEDP").

A further class of builders is that of phosphates such as STPP (pentasodium tripolyphosphate). Due to the fact that phosphates raise environmental concerns, it is preferred that advantageous inventive cleaning agents are free from phosphate. "Free from phosphate" should be understood in the context of the present invention, as meaning that the content of phosphate and polyphosphate is in sum in the range from 10 ppm to 0.2% by weight, determined by gravimetry and referring to the respective inventive cleaning agent.

A further class of builders is that of silicates, in particular sodium disilicate and sodium metasilicate, zeolites, sheet silicates, in particular those of the formula α-$Na_2Si_2O_5$, β-$Na_2Si_2O_5$, and δ-$Na_2Si_2O_5$.

In addition carbonates and hydrogencarbonates are used, among which the alkali metal salts, especially sodium salts, are preferred.

In one embodiment of the present invention, organic cobuilders are selected from polycarboxylates, for example alkali metal salts of (meth)acrylic acid homopolymers or (meth)acrylic acid copolymers, partially or completely neutralized with alkali.

Suitable comonomers for (meth)acrylic acid copolymers are monoethylenically unsaturated dicarboxylic acids such as maleic acid, fumaric acid, maleic anhydride, itaconic acid and citraconic acid. A suitable polymer is in particular polyacrylic acid, which preferably has an average molecular weight $M_w$ in the range from 2000 to 40 000 g/mol, preferably 3,000 to 10,000 g/mol. It is also possible to use copolymers of at least one monomer from the group consisting of monoethylenically unsaturated $C_3$-$C_{10}$-mono- or $C_4$-$C_{10}$-dicarboxylic acids or anhydrides thereof, such as maleic acid, maleic anhydride, acrylic acid, methacrylic acid, fumaric acid, itaconic acid and citraconic acid, with at least one hydrophilic or hydrophobic monomer as listed below.

Suitable hydrophobic monomers are, for example, isoprenol, isobutene, diisobutene, butene, pentene, hexene and styrene, olefins with 10 or more carbon atoms or mixtures thereof, such as, for example, 1-decene, 1-dodecene, 1-tetradecene, 1-hexadecene, 1-octadecene, 1-eicosene, 1-docosene, 1-tetracosene and 1-hexacosene, $C_{22}$-α-olefin, a mixture of $C_{20}$-$C_{24}$-α-olefins and polyisobutene having on average 12 to 100 carbon atoms per molecule.

Suitable hydrophilic monomers are monomers with sulfonate or phosphonate groups, and also nonionic monomers with hydroxyl function or alkylene oxide groups. By way of example, mention may be made of: allyl alcohol, isoprenol, methoxypolyethylene glycol (meth)acrylate, methoxypolypropylene glycol (meth)acrylate, methoxypolybutylene glycol (meth)acrylate, methoxypoly(propylene oxide-co-ethylene oxide) (meth)acrylate, ethoxypolyethylene glycol (meth)acrylate, ethoxypolypropylene glycol (meth)acrylate, ethoxypolybutylene glycol (meth)acrylate and ethoxypoly(propylene oxide-co-ethylene oxide) (meth)acrylate. Polyalkylene glycols here may comprise 3 to 50, in particular 5 to 40 and especially 10 to 30 alkylene oxide units per molecule.

Particularly preferred sulfonic-acid-group-containing monomers here are 1-acrylamido-1-propanesulfonic acid, 2-acrylamido-2-propanesulfonic acid, 2-acrylamido-2-methylpropanesulfonic acid, 2-methacrylamido-2-methylpropanesulfonic acid, 3-methacrylamido-2-hydroxypropanesulfonic acid, allylsulfonic acid, methallylsulfonic acid, allyloxybenzenesulfonic acid, methallyloxybenzenesulfonic acid, 2-hydroxy-3-(2-propenyloxy)propanesulfonic acid, 2-methyl-2-propene-1-sulfonic acid, styrenesulfonic acid, vinylsulfonic acid, 3-sulfopropyl acrylate, 2-sulfoethyl methacrylate, 3-sulfopropyl methacrylate, sulfomethacrylamide, sulfomethylmethacrylamide, and salts of said acids, such as sodium, potassium or ammonium salts thereof.

Particularly preferred phosphonate-group-containing monomers are vinylphosphonic acid and its salts.

Moreover, polyaspartic acid and its salts can also be used as cobuilder.

Inventive cleaning agents may comprise, for example, in the range from in total 5 to 70% by weight, preferably up to 50% by weight, of builder and cobuilder.

Inventive cleaning agents may comprise one or more antifoams, selected for example from silicone oils and paraffin oils.

In one embodiment of the present invention, inventive cleaning agents comprise in total in the range from 0.05 to 0.5% by weight of antifoam.

Inventive cleaning agents may comprise one or more enzymes. Examples of enzymes are lipases, hydrolases, amylases, proteases, cellulases, esterases, pectinases, lactases and peroxidases.

In one embodiment of the present invention, inventive cleaning agents may comprise, for example, up to 5% by weight of enzyme, preference being given to 0.1 to 3% by weight. Said enzyme may be stabilized, for example with the sodium salt of at least one $C_1$-$C_3$-carboxylic acid or $C_4$-$C_{10}$-dicarboxylic acid. Preferred are formates, acetates, adipates, and succinates.

To prevent glass corrosion, which is manifested by cloudiness, iridescence, streaks and lines on the glass, glass corrosion inhibitors are used. Preferred glass corrosion inhibitors are from the group of the magnesium, zinc and bismuth salts and complexes.

Inventive cleaning agents are excellent for cleaning hard surfaces and fibres.

The following examples illustrate the invention and demonstrate the benefits attached to the invention.

EXAMPLE 1

Inulin from dahlia tubers (15 g, 1 eq) and trimellitic anhydride (53.4 g, 3 eq), were solved in DMF (150 g) and 1-methyl-imidazole (0.78 g) and stirred at 70° C. for 7 h. The reaction mixture was cooled down. Solution of sodium hydroxide (44 g, 50% solution) in methanol (750 g) was added slowly to the reaction mixture. Formed precipitation was filtered off, washed with methanol (100 g) and dried in oven. The degree of substitution DS 1.6 was determined by $^{13}$C NMR.

EXAMPLE 2

Inulin from dahlia tubers (45 g, 1 eq) and trimellitic anhydride (133.4 g, 2.5 eq), were solved in DMF (450 g) and 1-methyl-imidazole (2.3 g) and stirred at 70° C. for 7 h. The reaction mixture was cooled down. Solution of sodium hydroxide (56 g, 50% solution) in ethanol (1300 g) was added slowly to the reaction mixture. Formed precipitation was filtered off, washed with methanol (400 g) and dried in oven. The degree of substitution DS 1.9 was determined by $^{13}$C NMR.

EXAMPLE 3

Inulin from dahlia tubers (30 g, 1 eq) was suspended in 70 mL of deionized water under stirring. 1-methyl-imidazole (0.15 g) was added to the suspension. The pH was adjusted at the reaction conditions with a pH-meter by adding 10M NaOH solution. Trimellitic anhydride (106.7 g, 3 eq) was added slowly over 5 h at 25° C. The pH was kept constant at 8.3-8.5 over the whole reaction time. The end of the reaction was established 1 h after the pH was kept constant. After water evaporation the product was found as a white powder. The degree of substitution DS 1.7 was determined by $^{13}$C NMR.

EXAMPLE 4

Inulin from dahlia tubers (45 g, 1 eq) was suspended in 400 mL of deionized water under stirring and cooled down to 0° C. The pH was adjusted at the reaction conditions with a pH-meter by adding 10M NaOH solution. Trimellitic anhydride (106.7 g, 2 eq) was added slowly over 3 h at 0° C. The pH was kept constant at 8.0 over the whole reaction time. The end of the reaction was established 1 h after the pH was kept constant. After water evaporation the product was found as a white powder. The degree of substitution DS 1.7 was determined by $^{13}$C NMR.

EXAMPLE 5 (COMPARATIVE EXAMPLE WITH SUCCINIC ACID)

Inulin from dahlia tubers (15 g, 1 eq) and succinic anhydride (27.8 g, 3 eq), were solved in DMF (150 g) and 1-methyl-imidazole (0.78 g) and stirred at 40° C. for 6 h. The reaction mixture was cooled down. Solution of sodium hydroxide (22 g, 50% solution) in methanol (650 g) was added slowly to the reaction mixture. Formed precipitation was filtered off, washed with methanol (100 g) and dried in oven. The degree of substitution DS 2 was determined by $^{13}$C NMR.

Application Test

CaCO$_3$-Inhibition Test

A polymeric antiscalant/dispersant helps to control water hardness and inhibits the formation of inorganic scale. The CaCO$_3$-inhibition test was performed for all samples as followed:

A CaCO$_3$ supersaturated solution is prepared in a PE beaker by adding known volumes of CaCl$_2$, MgSO$_4$, NaHCO$_3$ and polymer solutions to yield a solution containing 215 mg/l of Ca(II), 43 mg/l of Mg(II), 1220 mg/l of hydrogencarbonate and 5 mg/l of polymer. The beaker is capped, then placed in a water bath and shaked for two hours at 70° C. After filtration of the warm solution (Milex filter, 0.45 μm) the filtrate is analyzed for Ca(II) by EDTA titration in the presence of a Ca(II) selective electrode. The degree of inhibition is calculated using the following equation:

% Inhibition=[Ca(II)]$s$−[Ca(II)]$c$/[Ca(II)]$i$−[Ca(II)]$c$× 100% s sample containing scale inhibitor after 2 h c control after 2 h i initially

Conditions:

| | |
|---|---|
| [Ca$^{2+}$] | 215 mg/l |
| [Mg$^{2+}$] | 43 mg/l |
| [HCO$_3^-$] | 1220 mg/l |
| [Na$^+$] | 460 mg/l |
| [Cl$^-$] | 380 mg/l |
| [SO$_4^{2-}$] | 170 mg/l |
| pH | 8.0-8.5 |

A 1% by weight aqueous solution of inventive Polymer 1 (inulin esterified with trimellitic anhydride, DS 1.6, example 1) was prepared. After adjusting the pH-value to 10.5 the stirred solution was heated up to 60° C. During heating the pH was kept constant. After 0 min, 30 min, 1 h, 2 h, 3 h, 4 h and 5 h at 60° C. samples were taken and the CaCO$_3$-inhibition test was performed. The same was done with Polymer 5 (inulin esterified with succinic anhydride, DS 2, example 5). The results are shown on Table 1.

TABLE 1 results of CaCO3-Inhibition test for Polymer 1 and Polymer 5

| | CaCO$_3$-inhibition (%) | |
|---|---|---|
| Time (h) | Polymer 5 | Polymer 1 |
| 0 | 63.4 | 66.2 |
| 0.5 | 55.4 | 64.0 |
| 1 | 40.8 | 67.7 |
| 2 | 19.1 | 66.6 |
| 3 | 7.0 | 68.7 |
| 4 | 3.0 | 63.9 |
| 5 | 0 | 61.5 |

Whereas the calcium inhibition capacity of the succinated inulin (Polymer 5) decreases with time, the ester of inulin and trimellitic anhydride (Polymer 1) shows a stable performance.

The invention claimed is:

1. A carboxylate ester of polysaccharide, wherein the polysaccharide is esterified with trimellitic anhydride and wherein a degree of substitution of the polysaccharide lies in the range of from 1 to 2.5.

2. The carboxylate ester of polysaccharide according to claim 1, wherein the polysaccharide is inulin, maltodextrin, xyloglucan, alginate, starch, or a mixture thereof.

3. The carboxylate ester of polysaccharide according to claim 1, wherein the polysaccharide is inulin and an average chain length of the inulin lies in the range of from 3 to 100 fructose units.

4. The carboxylate ester of polysaccharide according to claim 1, wherein the polysaccharide is inulin and an average chain length of the inulin lies in the range of from 10 to 40 fructose units.

5. A method of preparing a carboxylate ester of polysaccharide of claim 1, comprising:
   i) mixing a polysaccharide with trimellitic anhydride and a catalyst in an organic solvent, wherein a molar ratio of trimellitic anhydride to monosaccharide unit lies in a range of from 1:2 to 4:1,
   ii) stirring the solution obtained in step i) at a temperature lying in a range of from 20 to 100° C. for 1 to 10 hours,
   iii) precipitating an esterified polymer obtained in step ii) by adding a mixture of sodium hydroxide and an alcohol to the reaction mixture obtained in step ii).

6. The method according to claim 5, wherein the solvent is pyridine, dimethylformamide, dimethyl sulfoxide, or a mixture thereof.

7. The method according to claim 5, wherein the catalyst is 1-methyl-imidazole.

8. A method of preparing a carboxylate ester of polysaccharide of claim 1, comprising:
   i) mixing a polysaccharide with water and with an aqueous alkali solution, which optionally comprises 1-methyl-imidazole,
   ii) stirring the solution obtained in step i) with trimellitic anhydride at a temperature lying in a range of from 0° C. to 50° C. for 1 to 10 hours, wherein the reaction is carried out at a pH of from 8 to 9 and wherein the molar ratio of trimellitic anhydride to monosaccharide unit lies in a range of from 1:2 to 4:1,
   iii) optionally precipitating the polymer obtained in step ii) by freeze drying, spray drying, or spray granulation.

9. A method for the preparation of a carboxylate ester of polysaccharide of claim 1, wherein a polysaccharide is reacted with trimellitic anhydride in an extruder or a kneader in the presence of a catalyst and wherein a molar ratio of trimellitic anhydride to monosaccharide unit lies in a range of from 1:2 to 4:1.

10. The method according to claim 9, wherein the polysaccharide is reacted in the presence of a non-ionic surfactant.

11. The method according to claim 9, wherein the catalyst is 1-methyl-imidazole.

12. An aqueous solution comprising the carboxylate ester of polysaccharide according to claim 1.

13. A laundry cleaning composition comprising from 0.1% to about 10% by weight of the carboxylate ester of polysaccharide according to claim 1 and from 1% to about 70% by weight of one or more surfactant.

14. A powder comprising the carboxylate ester of polysaccharide according to claim 1.

15. An automatic dishwashing detergent composition comprising from 0.1% to about 15% by weight of the carboxylate ester of polysaccharide according to claim 1, from 0.1% to 30% by weight of a bleach and optionally a bleach activator, and from 1% to about 30% by weight of one or more surfactant.

\* \* \* \* \*